United States Patent
Lee et al.

(10) Patent No.: US 9,810,081 B2
(45) Date of Patent: Nov. 7, 2017

(54) COOLED CONDUIT FOR CONVEYING COMBUSTION GASES

(75) Inventors: Ching-Pang Lee, Cincinatti, OH (US); Chander Prakash, Oviedo, FL (US); Reinhard Schilp, Orlando, FL (US); David A. Little, Chuluota, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 2239 days.

(21) Appl. No.: 12/813,658

(22) Filed: Jun. 11, 2010

(65) Prior Publication Data

US 2011/0302924 A1    Dec. 15, 2011

(51) Int. Cl.
| | |
|---|---|
| F01D 9/02 | (2006.01) |
| F23R 3/06 | (2006.01) |
| F02K 1/82 | (2006.01) |
| F23R 3/00 | (2006.01) |
| F23M 20/00 | (2014.01) |

(52) U.S. Cl.
CPC .............. F01D 9/023 (2013.01); F02K 1/822 (2013.01); F23M 20/005 (2015.01); F23R 3/002 (2013.01); F23R 3/06 (2013.01); *F05D 2250/13* (2013.01); *F05D 2250/324* (2013.01); *F05D 2260/202* (2013.01); *F23R 2900/00014* (2013.01); *F23R 2900/03042* (2013.01); *Y02T 50/675* (2013.01)

(58) Field of Classification Search
CPC .......... F01D 9/023; F02K 1/822; F23R 3/002; F23R 3/06; F23M 20/005
USPC ............................ 60/752, 754, 755, 756, 759
See application file for complete search history.

(56) References Cited

U.S. PATENT DOCUMENTS

| | | | |
|---|---|---|---|
| 3,995,422 A | 12/1976 | Stamm | |
| 4,259,842 A | 4/1981 | Koshoffer et al. | |
| 4,329,848 A | 5/1982 | Caruel et al. | |
| 4,485,630 A | 12/1984 | Kenworthy | |
| 4,655,044 A | 4/1987 | Dierberger et al. | |
| 4,705,455 A | 11/1987 | Sahm et al. | |
| 4,773,593 A * | 9/1988 | Auxier et al. ............. | 239/127.3 |
| 4,821,387 A | 4/1989 | Bouillot et al. | |
| 5,261,223 A | 11/1993 | Foltz | |
| 5,407,133 A | 4/1995 | Liang | |
| 5,415,000 A | 5/1995 | Mumford et al. | |
| 5,528,904 A * | 6/1996 | Jones et al. ..................... | 60/753 |

(Continued)

FOREIGN PATENT DOCUMENTS

| | | |
|---|---|---|
| GB | 2023232 A | 12/1979 |
| JP | 59112129 A | 6/1984 |
| WO | 0225174 A1 | 3/2002 |

*Primary Examiner* — Jacob Amick (57) ABSTRACT

A conduit through which hot combustion gases pass in a gas turbine engine. The conduit includes a wall structure having a central axis and defining an inner volume of the conduit for permitting hot combustion gases to pass through the conduit. The wall structure includes a forward end, an aft end axially spaced from the forward end, the aft end defining a combustion gas outlet for the hot combustion gases passing through the conduit, and a plurality of generally radially outwardly extending protuberances formed in the wall structure. The protuberances each include at least one cooling fluid passage formed therethrough for permitting cooling fluid to enter the inner volume. At least one of the protuberances is shaped so as to cause cooling fluid passing through it to diverge in a circumferential direction as it enters into the inner volume.

19 Claims, 4 Drawing Sheets

(56) References Cited

U.S. PATENT DOCUMENTS

| | | |
|---|---|---|
| 5,826,431 A | 10/1998 | Makino et al. |
| 6,250,082 B1 | 6/2001 | Hagle et al. |
| 6,408,629 B1 | 6/2002 | Harris et al. |
| 6,494,044 B1 | 12/2002 | Bland |
| 6,519,850 B2 | 2/2003 | McCaffrey et al. |
| 6,526,756 B2 | 3/2003 | Johnson et al. |
| 6,675,582 B2 | 1/2004 | Monty et al. |
| 7,080,515 B2 * | 7/2006 | Wasif et al. .................... 60/737 |
| 7,246,493 B2 | 7/2007 | Flohr et al. |
| 7,386,980 B2 | 6/2008 | Green et al. |
| 2005/0286998 A1 * | 12/2005 | Lee et al. ...................... 415/117 |
| 2008/0041058 A1 * | 2/2008 | Johnson et al. ................ 60/725 |
| 2009/0094985 A1 * | 4/2009 | Johnson et al. ................ 60/752 |
| 2010/0071382 A1 | 3/2010 | Liang |

* cited by examiner

COOLED CONDUIT FOR CONVEYING COMBUSTION GASES

FIELD OF THE INVENTION

The present invention relates to gas turbine engines and, more particularly, to a cooled conduit that conveys hot combustion gases.

BACKGROUND OF THE INVENTION

In turbine engines, compressed air discharged from a compressor section and fuel introduced from a source of fuel are mixed together and burned in a combustion section, creating combustion products defining hot combustion gases.

The combustion gases are directed through a hot gas path in a turbine section, where they expand to provide rotation of a turbine rotor. The turbine rotor is linked to a shaft to power the compressor section and may be linked to an electric generator to produce electricity in the generator.

One or more conduits, e.g., liners, transition ducts, etc., are typically used for conveying the combustion gases from one or more combustor assemblies located in the combustion section to the turbine section. Due to the high temperature of the combustion gases, the conduits are typically cooled during operation of the engine to avoid overheating.

Prior art solutions for cooling the conduits include supplying a cooling fluid, such as air that is bled off from the compressor section, onto an outer surface of the conduit to provide direct convection cooling to the transition duct. An impingement member or impingement sleeve may be provided about the outer surface of the conduit, wherein the cooling fluid may flow through small holes formed in the impingement member before being introduced onto the outer surface of the conduit. Other prior art solutions inject a small amount of cooling fluid along an inner surface of the conduit to provide film cooling to the inner surface of the conduit.

SUMMARY OF THE INVENTION

In accordance with a first aspect of the present invention, a conduit is provided through which hot combustion gases pass in a gas turbine engine. The conduit comprises a wall structure having a central axis and defining an inner volume of the conduit for permitting hot combustion gases to pass through the conduit. The wall structure comprises a forward end, an aft end axially spaced from the forward end, the aft end defining a combustion gas outlet for the hot combustion gases passing through the conduit, and a plurality of generally radially outwardly extending protuberances formed in the wall structure. The protuberances each include at least one cooling fluid passage formed therethrough for permitting cooling fluid to enter the inner volume. At least one of the protuberances is shaped so as to cause cooling fluid passing through it to diverge in a circumferential direction as it enters into the inner volume.

Each of the protuberances may include only one cooling fluid passage formed therethrough.

The conduit may comprise one of a combustor liner and a transition duct in the gas turbine engine.

The protuberances may be aligned with a resonator box that is affixed to the conduit.

The protuberances may be integral with a remaining portion of the wall structure.

At least one of the protuberances may define a front portion, a pair of side portions, a radially outer portion, and a back portion, each of the front and back portions extending at an angle with respect to the central axis. The cooling fluid passage of the at least one protuberance may extend through the radially outer portion of the at least one protuberance.

At least one of the protuberances may define a front portion, a pair of side portions, and a back portion, each of the front and back portions extending at an angle with respect to the central axis. The cooling fluid passage of the at least one protuberance may extend through the front portion of the at least one protuberance such that cooling fluid exiting the cooling fluid passage includes a velocity component in the same direction as the direction of flow of the hot combustion gases passing through the conduit.

At least one of the protuberances may comprise one of a diffuser shape and a cone shape.

At least one of the protuberances may be shaped such that it has a first section comprising the cooling fluid passage, wherein the first section has a first width in the circumferential direction, and a second section located axially downstream from the first section and having a second width in the circumferential direction greater than the first width.

In accordance with a second aspect of the present invention, a conduit is provided through which hot combustion gases pass in a gas turbine engine. The conduit comprises a wall structure having a central axis and defining an inner volume of the conduit for permitting hot combustion gases to pass through the conduit. The wall structure comprises a forward end, an aft end axially spaced from the forward end, the aft end defining a combustion gas outlet for the hot combustion gases passing through the conduit, and a plurality of generally radially outwardly extending protuberances formed in the wall structure. The protuberances each include only one cooling fluid passage formed therethrough for permitting cooling fluid to enter the inner volume.

At least one of the protuberances may be shaped so as to cause cooling fluid passing through it to diverge in a circumferential direction as it enters into the inner volume.

In accordance with a third aspect of the present invention, a conduit is provided through which hot combustion gases pass in a gas turbine engine. The conduit comprises a wall structure having a central axis and defining an inner volume of the conduit for permitting hot combustion gases to pass through the conduit. The wall structure comprises a forward end, an aft end axially spaced from the forward end, the aft end defining a combustion gas outlet for the hot combustion gases passing through the conduit, and a plurality of generally radially outwardly extending protuberances formed in the wall structure. At least one of the protuberances is shaped such that it has a first section and a second section. The first section comprises only one cooling fluid passage formed therethrough for permitting cooling fluid to enter the inner volume. The first section has a first width in the circumferential direction. The second section is located axially downstream from the first section and has a second width in the circumferential direction greater than the first width so as to cause cooling fluid passing through it to diverge in the circumferential direction as it enters into the inner volume.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
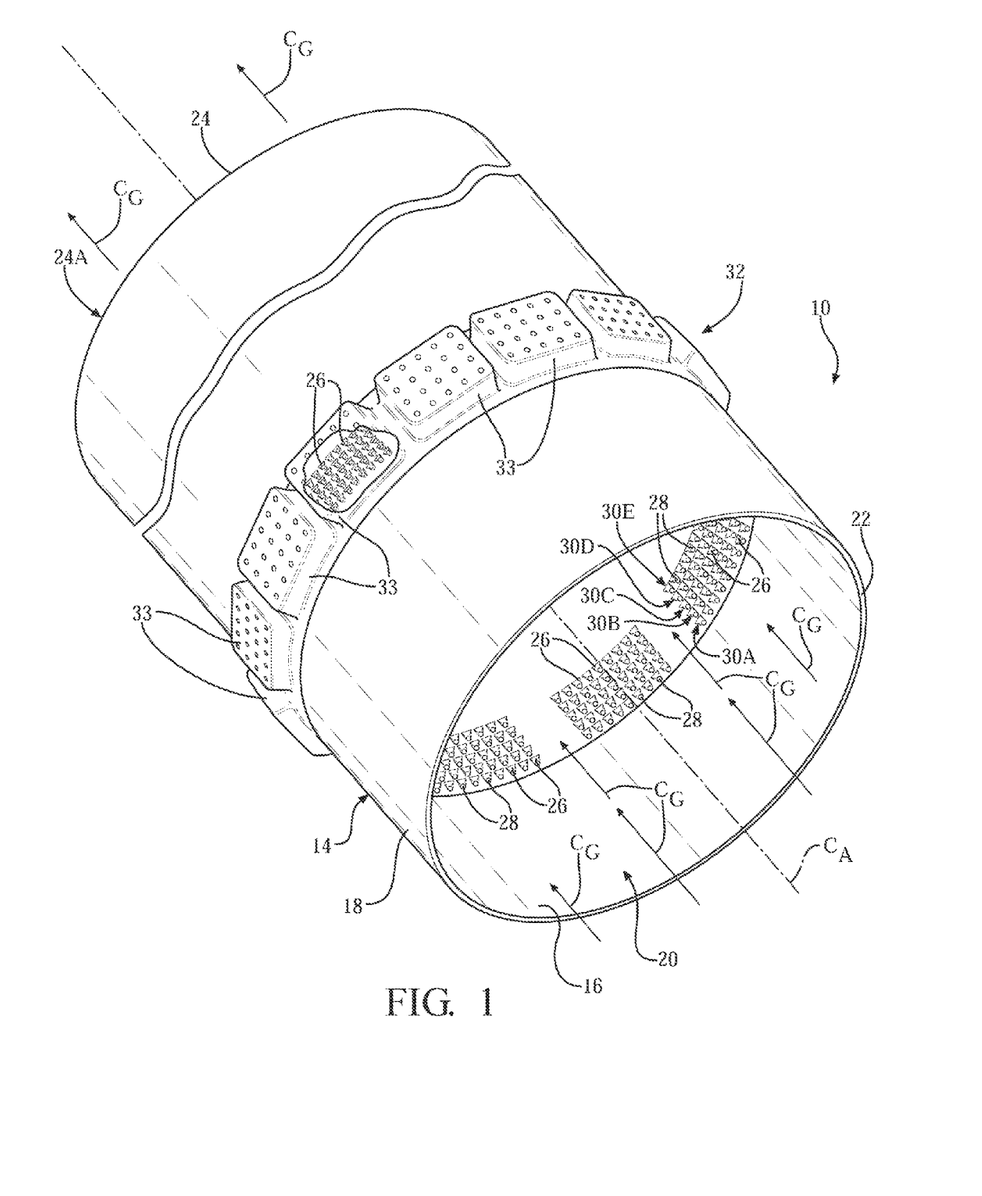
FIG. 1 is a perspective view of a portion of a conduit for use in a gas turbine engine according to an embodiment of the invention.

Referring to FIG. 1, a conduit 10 is illustrated for use in a gas turbine engine (not shown). The conduit 10 may be, for example, a liner or transition duct that conveys hot combustion gases from a combustion section (not shown) of the engine toward a turbine section (not shown) of the engine, such as the liner or transition duct disclosed in U.S. Pat. No. 5,415,000, issued May 16, 1995, entitled "LOW NOx COMBUSTOR RETRO-FIT SYSTEM FOR GAS TURBINES," the entire disclose of which is hereby incorporated by reference herein. The conduit 10 may also be the duct structure disclosed in U.S. application Ser. No. 11/498,479, filed Aug. 3, 2006, entitled "AT LEAST ONE COMBUSTION APPARATUS AND DUCT STRUCTURE FOR A GAS TURBINE ENGINE," by Robert J. Bland, the entire disclose of which is hereby incorporated by reference herein.

The conduit 10 comprises a wall structure 14 having a central axis $C_A$ and having an inner surface 16 and an outer surface 18. The inner surface 16 defines an inner volume 20 of the conduit 10 through which the hot combustion gases pass, see FIG. 1. The hot combustion gases are represented by the solid line-arrows $C_G$ in FIG. 1. The wall structure 14 also comprises a forward end 22 and an axially spaced aft end 24, which aft end 24 defines a combustion gas outlet 24A for the hot combustion gases $C_G$ passing through the conduit 10.

The wall structure 14 may be formed from a high heat tolerant material capable of operation in the high temperature environment of the combustion section of the engine, such as, for example, a stainless steel alloy or an INCONEL alloy (INCONEL is a registered trademark of Special Metals Corporation), although any suitable high heat tolerant material may be used to form the wall structure 14. Further, the wall structure 14 may comprise a single, unitary piece of material, or may be formed from a plurality of pieces of material that are joined together using any suitable method, such as, for example, by bolting or welding. Additionally, the inner surface 16 of the wall structure 14 may comprise a thermal barrier coating (not shown).

In the embodiment shown, the wall structure 14 comprises a generally cylindrical shape, although it is understood that the wall structure 14 could define other shapes, such as, for example, a rectangular shape. The wall structure 14 could also transition between multiple different shapes, such as, for example, from a generally cylindrical shape to a generally rectangular shape.

The wall structure 14 comprises a plurality of protuberances 26, each protuberance 26 comprising preferably only one cooling fluid passage 28 extending between the inner and outer surfaces 16 and 18 of the wall structure 14. It is contemplated, though, that each protuberance 26 may have more than one cooling fluid passage 28. As shown in FIG. 1, the protuberances 26 according to this aspect of the invention are aligned with a resonator structure 32, which resonator structure 32 is affixed to the wall structure 14. As will be apparent to those skilled in the art, the resonator structure 32 comprises a plurality of resonator boxes 33, which are used to attenuate acoustic vibrations in the combustion section of the engine. In the embodiment shown, the protuberances 26 are arranged in five generally circumferentially extending rows 30A, 30B, 30C, 30D and 30E within each resonator box 33, each row comprising nine protuberances 26, although it is noted that number of the protuberances 26 and rows may vary depending on the particular engine being used, i.e., the number of protuberances 26 can be any number. Further, the arrangement of the protuberances 26 and rows could be configured in other patterns as desired, such as, for example, a staggered pattern. Moreover, while all of the protuberances 26 shown in FIG. 1 are arranged within the resonator boxes 33, it is understood that additional protuberances 26 may be located elsewhere on the conduit 10, such as between the resonator boxes 33.

Figure 2:
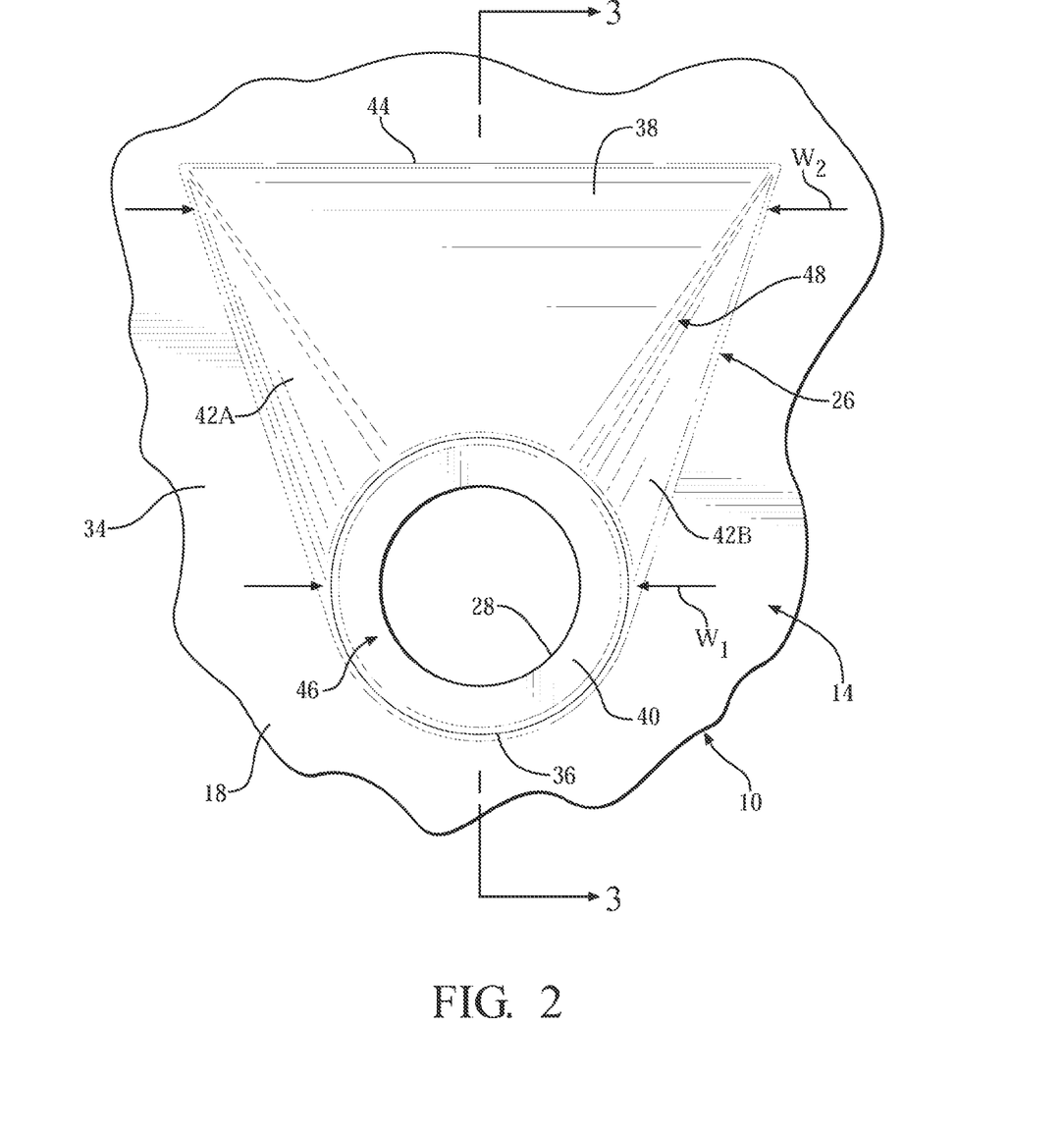
FIG. 2 is an enlarged top view of a portion of the conduit illustrated in FIG. 1 showing a protuberance formed in the conduit.
Figure 3:
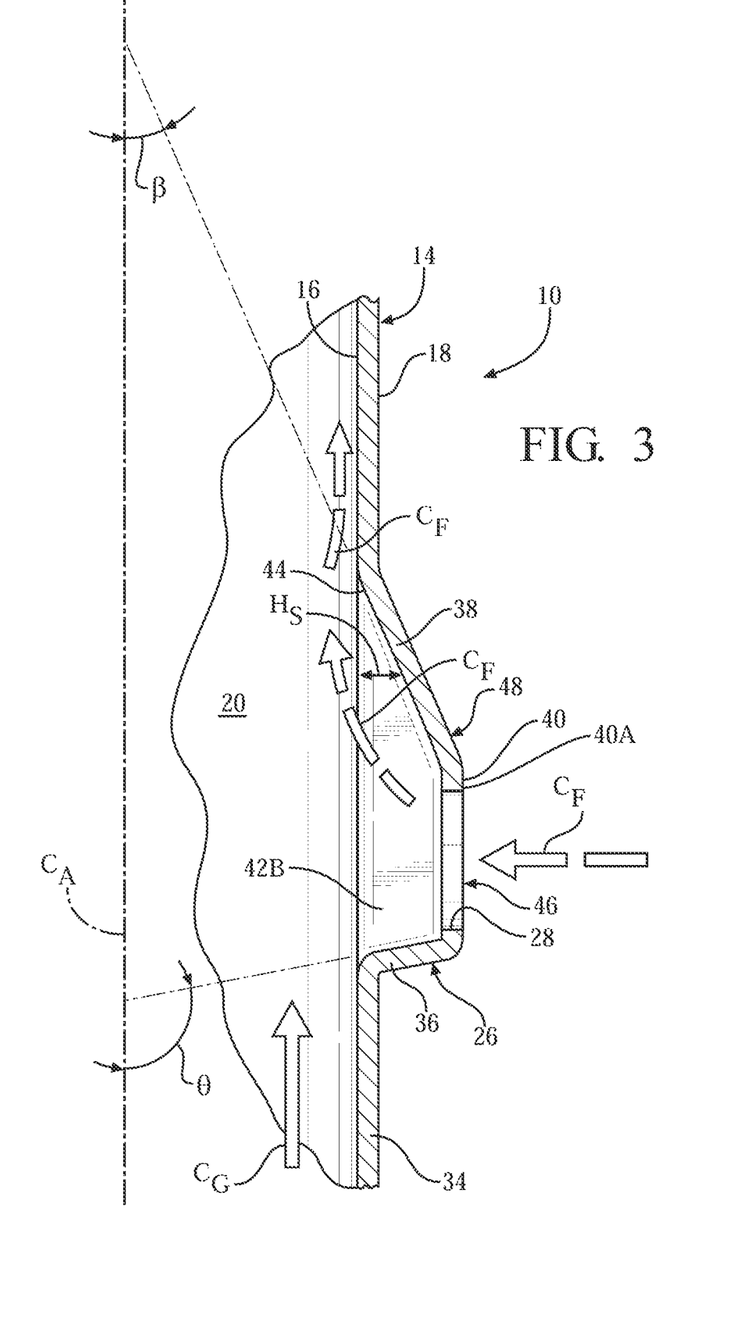
FIG. 3 is an enlarged cross sectional view of the protuberance illustrated in FIG. 2 taken along line 3-3.

Referring to FIGS. 2 and 3, one of the protuberances 26 of the wall structure 14 will now be described, it being understood that the remaining protuberances 26 may be substantially similar to the protuberance 26 described.

The protuberance 26 extends radially outwardly from a remaining portion 34 of the wall structure 14 and is integral with the remaining portion 34 of the wall structure 14. The protuberance 26 according to this embodiment defines a front portion 36, a back portion 38, a radially outer portion 40, and a pair of side portions 42A and 42B.

The front portion 36 extends at an angle θ of about 90° to about 120° relative to the central axis $C_A$ of the conduit 10, see FIG. 3. As shown in FIG. 2, the front portion 36 may comprise a curved wall portion extending between the side portions 42A and 42B.

The back portion 38 extends from the radially outer portion 40 to a back edge 44 of the protuberance 26 at an angle β of about 10° to about 60° relative to the central axis $C_A$ of the conduit 10, see FIG. 3. The back portion 38 may comprise a smooth, flat wall portion as shown in FIGS. 2 and 3.

The radially outer portion 40 may comprise an axially extending and generally flat, e.g., planar, radially outermost wall portion 40A extending generally parallel to the central axis $C_A$ and having a generally circular shape, as shown in FIGS. 2 and 3. The cooling fluid passage 28 according to this embodiment extends through the radially outermost wall portion 40A, which cooling fluid passage 28 may comprise a generally circular shape, see FIG. 2. It is contemplated that the cooling passage 28 could extend through other portions of the protuberance 26, such as, for example, the back portion 38, the front portion 36, and/or the side portions 42A, 42B.

The side portions 42A and 42B diverge away from one another as they extend from the front portion 36 of the protuberance 26 to the back edge 44 of the protuberance 26. As shown in FIG. 3, a radial height $H_S$ of the side portions 42A and 42B decreases as the side portions 42A and 42B extend toward the back edge 44.

The protuberance 26 includes a first section 46 that comprises the cooling fluid passage 28, and a second section 48 located axially downstream from the first section 46, as shown in FIGS. 2 and 3. The first section 46 has a first width $W_1$ in the circumferential direction that is less that a second width $W_2$ of the second section 48 in the circumferential direction, see FIG. 2. Such a configuration can be achieved wherein the protuberance 26 comprises a diffuser shape, as shown in FIGS. 2 and 3. As one alternative, the protuberance 26 could comprise a cone shape, wherein the back portion 38 and the side portions 42A and 42B of the protuberance 26 could be combined into a single, curved portion extending from the first section 46 of the protuberance 26 to the back edge 44.

It is noted that, while the front portion 36 of each protuberance 26 in the embodiment shown is located generally in line with the back portion 38, other configuration are conceivable, such as wherein the front portion 36 and the back portion 38 are angled relative to the central axis $C_A$ of the conduit 10.

During operation of the engine, cooling fluid $C_F$ (See FIG. 3) is provided to cool the conduit 10, which, if not cooled, may become overheated by the hot combustion gases $C_G$ flowing through the inner volume 20 thereof. Specifically, the cooling fluid $C_F$ flows through the cooling fluid passages 28 and passes downstream to the second sections 48 of the protuberances 26. It is noted that the cooling fluid $C_F$ passes toward the inner volume 20 of the conduit 10 through the cooling fluid passages 28 as a result of the pressure inside the conduit 10 being less than the pressure outside of the conduit 10. This pressure differential also substantially prevents the hot combustion gases $C_G$ from passing out of the inner volume 20 of the conduit 10 through the cooling fluid passages 28.

The cooling fluid $C_F$ flows through the second section 48 of each protuberance 26 along the back portion 38 and the side portions 42A and 42B of each protuberance 26. As a result of the side portions 42A and 42B diverging away from one another in the downstream direction, the cooling fluid $C_F$ flowing within each protuberance 26 is diffused as it flows toward the back edge 44 of each protuberance 26, caused by a diverging flow through the second section 48 of each protuberance 26.

Upon exiting the protuberances 26, at least a portion of the cooling fluid $C_F$ flows along the inner surface 16 of the wall structure 14 to provide film cooling for the inner surface 16 of the wall structure 14, see FIG. 3. Since the cooling fluid $C_F$ is diffused within the protuberances 26, film attachment to the inner surface 16 of the wall structure 14 adjacent to the protuberances 26 is believed to be improved as the cooling fluid $C_F$ exits the protuberances 26. That is, since the cooling fluid $C_F$ is diffused as it flows through the second sections 48 of the protuberances 26, the velocity of the cooling fluid $C_F$ is reduced, thereby reducing the momentum of the cooling fluid $C_F$ exiting the protuberances 26 and entering the inner volume 20 of the conduit 10. By reducing the momentum of the cooling fluid $C_F$, cooling fluid "blow off" is believed to be reduced, such that the cooling fluid $C_F$ is more likely to flow along the inner surface 16 of the wall structure 14, rather than be injected radially inwardly into the flow path of the hot combustion gases $C_G$.

Figure 4:
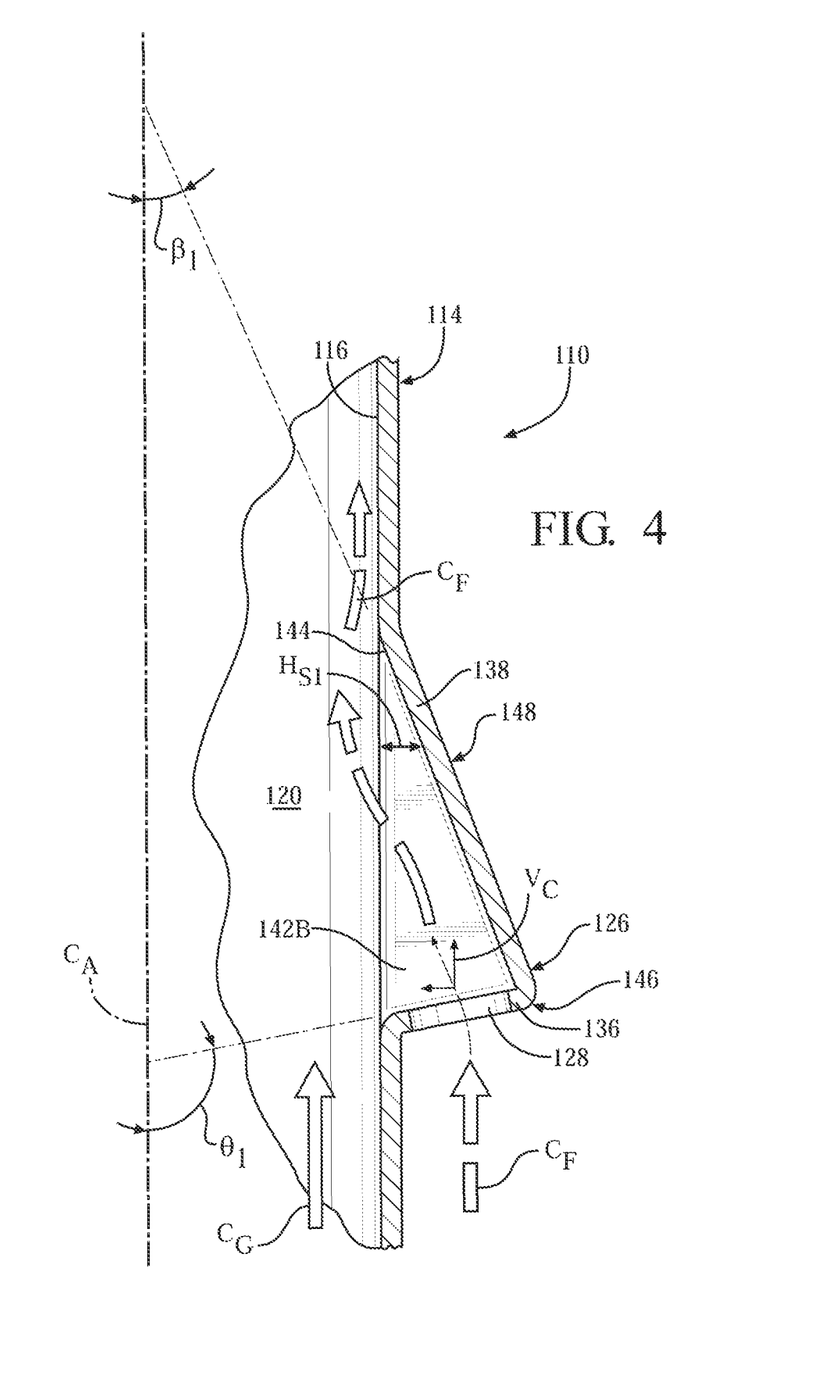
FIG. 4 is an enlarged cross sectional view of a protuberance formed in a conduit according to another embodiment of the invention.

Referring to FIG. 4, a portion of a conduit 110 according to another embodiment of the invention is shown. As with the conduit 10 described above with respect to FIGS. 1-3, the conduit 110 according to this embodiment comprises a wall structure 114 including a plurality of protuberances 126 (only one protuberance 126 is illustrated in FIG. 4.)

In this embodiment, the protuberance 126 defines a front portion 136, a back portion 138, and pair of side portions (only the second side portion 1428 is illustrated in FIG. 4), and is without a radially outer portion as described above with respect to FIGS. 1-3. As with the embodiment described above for FIGS. 1-3, the back portion 138 and the side portions 142B may comprise three separate portions, or may be combined to form a single, curved portion of the protuberance 126.

The front portion 136 extends at an angle $\theta_1$ of about 90° to about 120° relative to a central axis $C_A$ of the conduit 110. The front portion 136 may comprise, for example, a curved wall portion or a generally straight wall portion extending between the side portions 142B. A cooling fluid passage 128 according to this embodiment extends through the front portion 136 of the protuberance 126. It is contemplated that the cooling passage 128 could extend through other portions of the protuberance 126, such as, for example, the back portion 138, and/or the side portions 142B.

The back portion 138 according to this embodiment extends from the front portion 136 to a back edge 144 of the protuberance 126 at an angle $\beta_1$ of about 10° to about 60° relative to the central axis $C_A$ of the conduit 110. The back portion 138 may comprise a smooth, flat wall portion as shown in FIG. 4, or may comprise a curved wall portion that is combined with the side wall portions 142A and 142B in a cone-shape wall portion, as discussed above.

The side portions 142B diverge away from one another as they extend from the front portion 136 of the protuberance 126 to the back edge 144 of the protuberance 126. As shown in FIG. 4, a radial height $H_{S1}$ of the side portions 142B decreases as the side portions 142B extend from the front portion 136 to the back edge 144.

The protuberance 126 includes a first section 146 that comprises the cooling fluid passage 128, and a second section 148 located axially downstream from the first section 146, as shown in FIG. 4. The first section 146 has a first width (not shown in this embodiment) in the circumferential direction that is less that a second width (not shown in this embodiment) of the second section 148 in the circumferential direction. Such a configuration can be achieved wherein the protuberance 126 comprises, for example, a diffuser shape or a cone shape.

In this embodiment, since the cooling fluid passage 128 extends through the front portion 136 of the protuberance 126, cooling fluid $C_F$ passing through the cooling fluid passage 128, as the cooling fluid $C_F$ exits the cooling fluid passage 128, includes a velocity component $V_C$ in the same direction as the direction of flow of hot combustion gases $C_G$ passing through an inner volume 120 of the conduit 110. Hence, attachment of the cooling fluid $C_F$ onto an inner surface 116 of the wall structure 114 is believed improved by the configuration according to this embodiment.

Remaining structure and its operation according to this embodiment is the same as described above with respect to FIGS. 1-3.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A conduit through which hot combustion gases pass in a gas turbine engine, the conduit comprising:
 a wall structure having a central axis and defining an inner volume of the conduit for permitting hot combustion gases to pass through the conduit, said wall structure comprising:
  a forward end;
  an aft end axially spaced from said forward end, said aft end defining a combustion gas outlet for the hot combustion gases passing through the conduit;
  a resonator structure including a plurality of resonator boxes for attenuating acoustic vibrations within the engine; and
  a plurality of generally radially outwardly extending protuberances located in a circumferential band in said wall structure, said protuberances each including at least one cooling fluid passage formed therethrough for permitting cooling fluid to enter said inner volume, wherein at least one of said protuberances is shaped so as to cause cooling fluid passing through it to diverge in a circumferential direction as it enters into said inner volume and wherein said protuberances are aligned with said resonator structure; and
 wherein at least one of said protuberances defines a front portion, a pair of side portions, a radially outer portion including a radially outermost wall portion, and a back portion, each of said front and back portions extending at an angle with respect to said central axis, and said cooling fluid passage of said protuberance extends through said radially outermost wall portion of said protuberance.

2. The conduit according to claim 1, wherein each of said protuberances includes only one cooling fluid passage formed therethrough.

3. The conduit according to claim 1, wherein the conduit comprises one of a combustor liner and a transition duct in the gas turbine engine.

4. The conduit according to claim 1, wherein said protuberances are integral with a remaining portion of said wall structure.

5. The conduit according to claim 1, wherein at least one of said protuberances comprises one of a diffuser shape and a cone shape.

6. The conduit according to claim 1, wherein at least one of said protuberances is shaped such that it has:
 a first section comprising said cooling fluid passage, wherein said first section has a first width in the circumferential direction; and
 a second section located axially downstream from said first section and having a second width in the circumferential direction greater than said first width.

7. A conduit through which hot combustion gases pass in a gas turbine engine, the conduit comprising:
 a wall structure having a central axis and defining an inner volume of the conduit for permitting hot combustion gases to pass through the conduit, said wall structure comprising:
  a forward end;
  an aft end axially spaced from said forward end, said aft end defining a combustion gas outlet for the hot combustion gases passing through the conduit;
  a resonator structure including a plurality of resonator boxes for attenuating acoustic vibrations with the engine; and
  a plurality of generally radially outwardly extending protuberances located in a circumferential band in said wall structure, said protuberances each including only one cooling fluid passage formed therethrough for permitting cooling fluid to enter said inner volume and wherein said protuberances are aligned with said resonator structure; and
 wherein at least one of said protuberances defines a front portion, a pair of side portions, a radially outer portion including a radially outermost wall portion, and a back portion, each of said front and back portions extending at an angle with respect to said central axis, and said cooling fluid passage of said protuberance extends through said radially outermost wall portion of said protuberance.

8. The conduit according to claim 7, wherein at least one of said protuberances is shaped so as to cause cooling fluid passing through it to diverge in a circumferential direction as it enters into said inner volume.

9. The conduit according to claim 8, wherein said at least protuberance comprises one of a diffuser shape and a cone shape.

10. The conduit according to claim 8, wherein said at least one protuberance is shaped such that it has:
 a first section comprising said cooling fluid passage, wherein said first section has a first width in the circumferential direction; and
 a second section located axially downstream from said first section and having a second width in the circumferential direction greater than said first width.

11. A conduit through which hot combustion gases pass in a gas turbine engine, the conduit comprising:
 a wall structure having a central axis and defining an inner volume of the conduit for permitting hot combustion gases to pass through the conduit, said wall structure comprising:
  a forward end;
  an aft end axially spaced from said forward end, said aft end defining a combustion gas outlet for the hot combustion gases passing through the conduit; and
  a plurality of generally radially outwardly extending protuberances located in a circumferential band in said wall structure, said protuberances including:
   a first section comprising only one cooling fluid passage formed therethrough for permitting cooling fluid to enter said inner volume, said first section having a first width in the circumferential direction and said cooling fluid passage of said protuberance extends through a radially outermost wall portion of said first section of said protuberance; and
   a second section located axially downstream from said first section and having a second width in the circumferential direction greater than said first width so as to cause cooling fluid passing through it to diverge in the circumferential direction as it enters into said inner volume; and
  a plurality of resonator boxes extending radially outwardly from said wall structure, said resonator boxes attenuating acoustic vibrations within the engine, wherein all of said protuberances are formed in said respective resonator boxes.

12. The conduit according to claim 11, wherein said protuberances are arranged within a plurality of rows within said resonator boxes.

13. The conduit according to claim 12, wherein the rows of said protuberances within each resonator box are aligned with one another.

14. The conduit according to claim 12, wherein the rows of said protuberances within each resonator box are staggered with respect to one another.

15. The conduit according to claim 1, wherein said radially outermost wall portion comprises a planar wall portion extending generally parallel to said central axis.

16. The conduit according to claim 15, wherein said radially outermost wall portion comprises a generally circular shape.

17. The conduit according to claim 7, wherein said radially outermost wall portion comprises a planar wall portion extending generally parallel to said central axis.

18. The conduit according to claim 17, wherein said radially outermost wall portion comprises a generally circular shape.

19. The conduit according to claim 11, wherein:
at least one of said protuberances defines a front portion, a pair of side portions, a radially outer portion including a radially outermost wall portion, and a back portion, each of said front and back portions extending at an angle with respect to said central axis; and
said cooling fluid passage of said at least one protuberance extends through said radially outermost wall portion of said at least one protuberance.

\* \* \* \* \*